Aug. 27, 1957  F. VEATCH  2,804,393
AMMONIA RESISTANT CEMENT
Filed Dec. 31, 1954
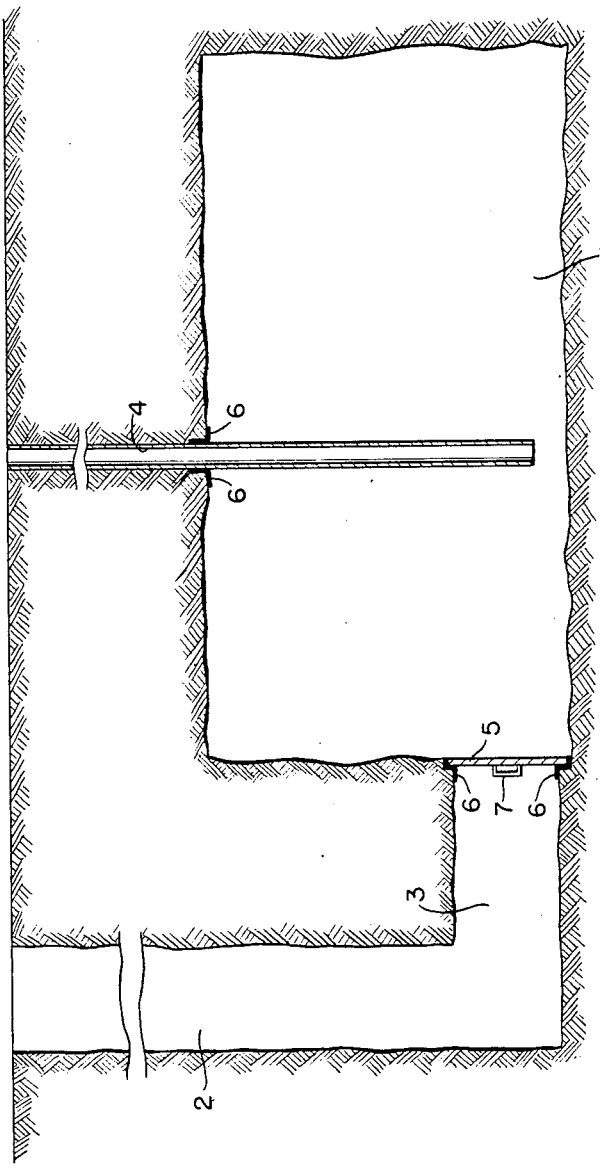
INVENTOR.
FRANKLIN VEATCH
BY
Leland L. Chapman
ATTORNEY.

United States Patent Office 2,804,393
Patented Aug. 27, 1957

2,804,393

AMMONIA RESISTANT CEMENT

Franklin Veatch, Lyndhurst, Ohio, assignor to The Standard Oil Company, Cleveland, Ohio, a corporation of Ohio Application December 31, 1954, Serial No. 479,060

6 Claims. (Cl. 106—90)

The present invention relates to a sealing compound which is chemically resistant and impervious to anhydrous ammonia, and to a component thereof. The invention also relates to containers for ammonia having seals therein made from this sealing compound.

Anhydrous (water-free) ammonia is becoming increasingly important as an article of commerce, particularly in its use as a fertilizer. Storage of anhydrous ammonia in huge tonnages which is to be used for fertilizer is necessary due to the continuous nature of ammonia processes and the seasonal nature of the fertilizer use. Facilities for such storage, therefore, present unique problems.

One of the methods suggested for the storage of anhydrous ammonia has been to store the ammonia underground in mined caverns or salt domes as is now commonly done in the case of liquefied petroleum gases by the petroleum industry. However, if ammonia is to be stored underground, such underground storage facilities must be adequately sealed to prevent the escape of ammonia. This is so both from the standpoint of safety and from the standpoint of economics. However, since anhydrous ammonia is both chemically active and hygroscopic, proper sealing of such storage containers presents a special problem. Concrete or cement, which is used to seal a cavity for storing liquid petroleum gas, cannot be used because ammonia attacks cement.

The object of the present invention, therefore, is the preparation of a composition which will be at once both resistant to chemical attack by ammonia and impervious to the ammonia gas.

One of the sealing compositions of the prior art is a cement prepared from litharge and glycerin. This cement is known to be relatively chemically resistant, especially to acids. However, the litharge-glycerin cement is not impervious to anhydrous ammonia and has no utility as a sealing composition in the case of ammonia.

I have discovered that if a compound or composition capable of chemically bonding water is added to a litharge-glycerin sealing composition of the prior art, a sealing composition is obtained which is effective in the case of anhydrous ammonia. In brief, the essential components of the composition of this invention are a lead oxide, glycerin, and a compound capable of chemically bonding water. A small amount of a surface active agent may also be employed.

The use of the sealing composition of the invention will be better understood in connection with the single sheet of drawings forming a part hereof and which illustrates a mined cavern 1 which may be located several hundred feet in the ground in a suitable rock formation. This cavern is mined by means of a shaft 2 through which the rock is removed to the surface. A tunnel 3 connects the shaft 2 to the main cavern 1. After the cavern is complete a hole is drilled, through which a pipe 4 is inserted reaching nearly to the bottom of the cavern, and through which liquid anhydrous ammonia may be introduced or withdrawn. A plurality of such pipes may be utilized, if desired. After the cavern is complete it is necessary to seal off the main cavern 1 from the tunnel 3. This can be done by assembling a large steel plate 5 which can be welded from pieces inside the cavern 1 and which can be placed in position against the tunnel 3 by means of the handle 7. The sealing composition 6 is inserted between the pipe 4 and the formation, as well as between the plate 5 and the formation in order to seal any space between the pipe and the plate and the formation.

The lead oxide of the composition of the invention may be any commercial grade ranging from yellow to red, including PbO, PbO$_2$, Pb$_3$O$_4$, Pb$_2$O$_3$, and Pb$_2$O. However, the most readily available of these commercially is litharge (PbO) and for this reason litharge is preferred in the composition of this invention.

The glycerin may be any commercial grade. It should be substantially anhydrous but available grades meet this requirement. Glycidol, which is an anhydride of glycerin, is an equivalent of glycerin and may be used in place thereof. However, glycerin is preferred because it is the most readily available.

Compounds which are capable of chemically bonding water and which comprise the third-mentioned component of the invention are lime, calcium sulfate, Portland cement, alumina cement and other oxides or salts known to bind water chemically. They are preferably finely divided solids which form inert materials upon combining with water. A composition containing Portland cement is regarded as the best mode of carrying out the invention and is, therefore, selected as the drying agent in the following illustrative example, although any other drying agent of the type described which chemically combines water is entirely satisfactory, and other such ingredients will be known to a chemist skilled in the art.

A small amount of a surface active agent may be included to extend the setting time of the cement, if desired.

Extenders and aggregates such as are commonly used with cement and which are inert may be added to this composition without impairing the chemical resistance of the cement. For example, sand may be added to the composition. However, the only limitation on the amount of extender or aggregate which may be added is that it must not be present in amounts which would render the cement permeable to the ammonia.

While I do not want to be limited to any theory, I believe that the results of my invention may be explained by the fact that the litharge-glycerin composition of the prior art contains water formed in situ as a product of reaction. The ammonia, having a great affinity for water, penetrates the composition to reach the water and destroys its effectiveness as a seal. By removing the water in situ with a component that combines the water chemically, the composition is rendered resistant to ammonia. This component and the chemically bound water must be inert to ammonia and preferably a solid.

The proportions of the ingredients may be varied but for effectiveness they should not be extended beyond 2–5:1:0.1–2 parts by weight respectively. The preferred range is 3–4:1:0.25–0.75. The preferred amount of lead oxide to glycerin is not less than 3 parts of lead oxide to each part of glycerin. Lesser amounts of lead oxide result in relatively higher proportion of glycerin which may tend not to react completely and which, being hygroscopic and having free OH groups, may attract the ammonia and ruin the effectiveness of the composition as a seal. The amount of the lead oxide, on the other hand, should not be too great, and preferably not above 4, because as the proportion of this ingredient is increased, the mixture becomes thicker and the amount of the drying agent that may be used to obtain practical fluidity is limited. When the lead oxide is pre-mixed with the drying agent, the range will be 1:0.02–1.0 parts by weight, preferably 1:0.05–0.2.

In order to test the composition of this invention, a test bomb was constructed of a heavy gauge pipe. A cap was tightly fitted to one end and the opposite end was equipped with a pressure gauge and a needle valve in order to charge ammonia to the bomb. Toward one end of the pipe 8 slots evenly distributed about the circumference 1" long and and ¼" wide were milled. In order to test a sealing composition, the slits in the pipe were sealed with tape and a sample of the sealing composition was poured into the bomb to a depth of about 4". When the cement had set the tape was removed from the outside of the pipe. The bomb was then weighed, charged with ammonia and weighed again. Thereafter, weighings were taken at intervals to determine the weight of ammonia being lost through the cement.

Four compositions were tested:

(1) A seal formed of Portland cement mixed with 0.353 lb. of water per pound of cement.

(2) A seal formed of Lumnite cement mixed with water in the ratio of 0.353 lb. of water per pound of cement.

(3) A lead oxide-glycerin cement mixed in the proportions of 4:1 by weight.

(4) A lead oxide-glycerin-Portland cement composition made in accordance with the invention mixed in the proportions of 4:1:0.5.

The results of the tests are as follows:

| Composition No. | Composition | Charge, g. | Weight Loss | | |
|---|---|---|---|---|---|
| | | | hrs. | g. | Percent of charge |
| 1 | Portland Cement | 91 | 144 | 80 | 88 |
| 2 | Lumnite Cement | 115 | 144 | 112 | 97 |
| 3 | PbO-glycerin | 63 | 22 | 5 | 8 |
| | | | 92 | 27 | 43 |
| | | | 119 | 34 | 54 |
| | | | 141 | 41 | 65 |
| | | | 164 | 47 | 75 |
| 4 | PbO-glycerin-Portland cement. | 165.5 | 24 | 0.5 | 0.3 |
| | | | 31 | 0.5 | 0.3 |
| | | | 48 | 0.5 | 0.3 |
| | | | 72 | 1.0 | 0.6 |
| | | | 96 | 1.0 | 0.6 |
| | | | 123 | 0.5 | 0.3 |
| | | | 167 | 1.0 | 0.6 |
| | | | 191 | 0.5 | 0.3 |

From the above results it will be seen that Portland and Lumnite cements are entirely ineffective since at the end of 144 hours almost all of the charge is lost. The PbO-glycerin-cement of the prior art, while somewhat better, loses three-fourths of the charge in 164 hours.

The fourth composition, in accordance with the invention, is effective after storage for 191 hours and shows no sign or trend of breaking down in this period—the differences shown being within the errors of weighing for this large apparatus.

The above described compositions of the invention have a reasonably long setting time, on the order of one hour; but if this setting time is to be increased, which may be desirable when working with large quantities for large seals, this can be accomplished by adding a small amount of a surface-active agent, examples of which are sodium heptadecyl sulfate (Tergitol 7) and sorbitan monolaurate (Span 20). A wide variety of surface-active agents can be used and their action is essentially a physical one in slowing the rate of reaction. Typical results on the same composition as in Example 4 in the previous table when employing the above two mentioned surface-active agents are as follows:

| Sample | Additive | Amount, percent | Setting Time (hours) |
|---|---|---|---|
| 4 | None | None | 1.2 |
| 5 | Span 20 | 0.22 | 13.25 |
| 6 | do | 0.27 | 28.00 |
| 7 | do | 0.54 | 36.5 |
| 8 | Tergitol 7 | 0.22 | 21.00 |
| 9 | do | 0.27 | 37.00 |
| 10 | do | 0.54 | 48.00 |

Compositions containing the surface-active agent are equally effective in resisting attack by ammonia.

I claim:

1. A composition effective as a seal and resistant to anhydrous ammonia formed from a mixture consisting essentially of lead oxide, substantially anhydrous glycerin, and a solid compound capable of chemically combining water, said ingredients being in the ratio of 2–5:1:0.1–2.0 parts by weight.

2. A composition effective as a seal and resistant to anhydrous ammonia formed from a mixture consisting essentially of litharge, substantially anhydrous glycerin, and a solid compound capable of chemically combining water, said ingredients being in the ratio of 3–4:1:0.25–0.75 parts by weight.

3. A composition effective as a seal resistant to anhydrous ammonia formed from a mixture consisting essentially of litharge, substantially anhydrous glycerin, and Portland cement, said ingredients being in the ratio of 4:1:0.5 parts by weight.

4. A composition suitable for admixture with substantially anhydrous glycerin to form a settable cement resistant to anhydrous ammonia consisting substantially of lead oxide and a solid compound capable of chemically combining water, said ingredients being in the ratio of 1:1–0.02 parts by weight.

5. A composition suitable for admixture with substantially anhydrous glycerin to form a settable cement resistant to anhydrous ammonia consisting essentially of litharge and a solid compound capable of chemically combining water, said ingredients being in the ratio of 1:0.05–0.2 parts by weight.

6. A composition suitable for admixture with substantially anhydrous glycerin to form a settable cement resistant to anhydrous ammonia consisting essentially of litharge and Portland cement, said ingredients being in the ratio of 1:0.1 parts by weight.

References Cited in the file of this patent

UNITED STATES PATENTS

| 156,112 | Abbott | Oct. 20, 1874 |
| 326,317 | Mixer | Sept. 15, 1885 |
| 1,719,210 | Burn | July 2, 1929 |

OTHER REFERENCES

Page 37 of "The Chemical Formulary," vol. 2 (1935).